Figure 1:
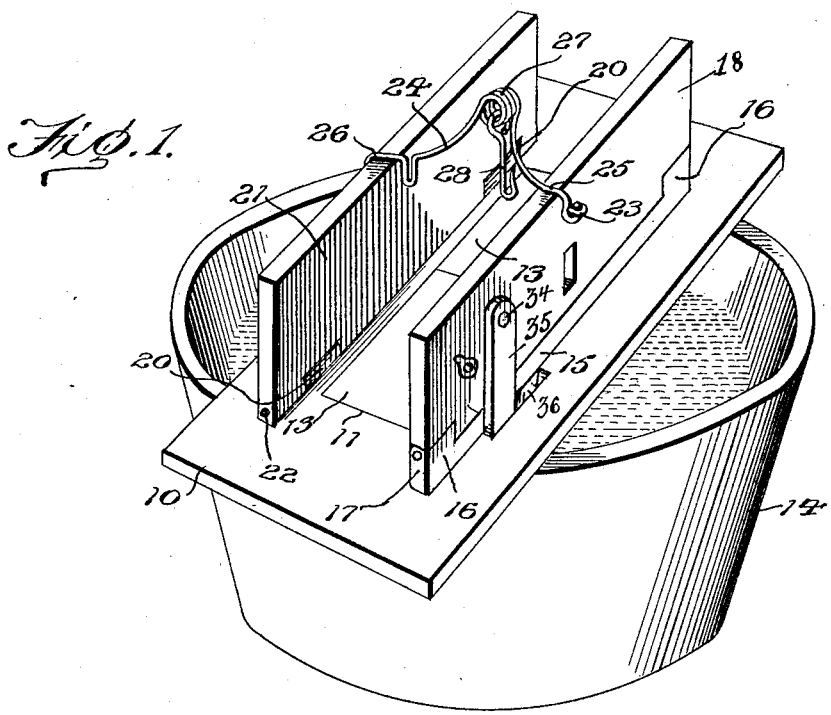

N. MIETTUNEN.
TRAP.
APPLICATION FILED FEB. 25, 1913.

1,109,652.

Patented Sept. 1, 1914.
2 SHEETS—SHEET 1.

Inventor
N. Miettunen.

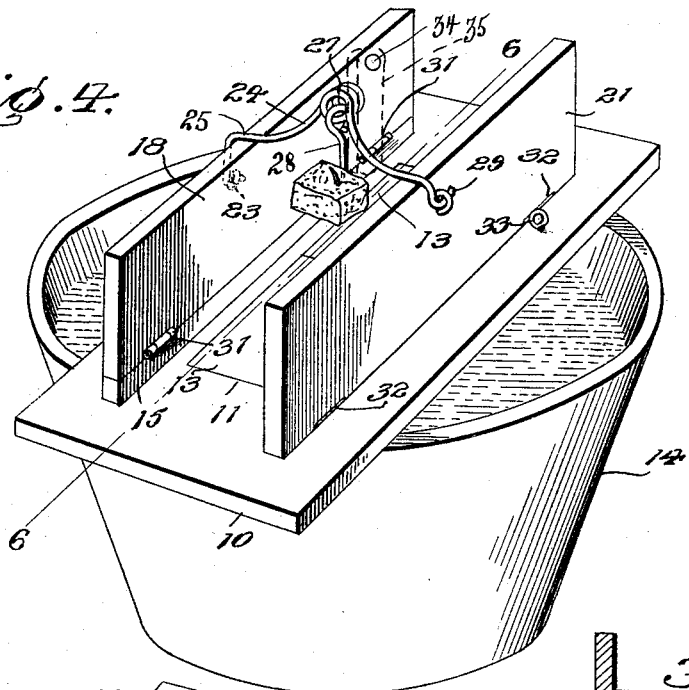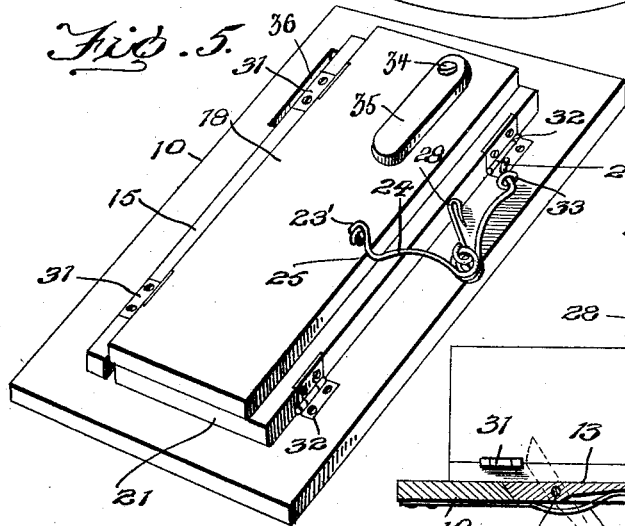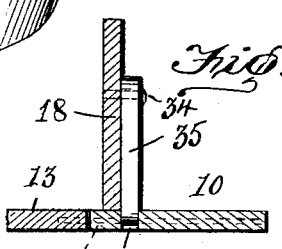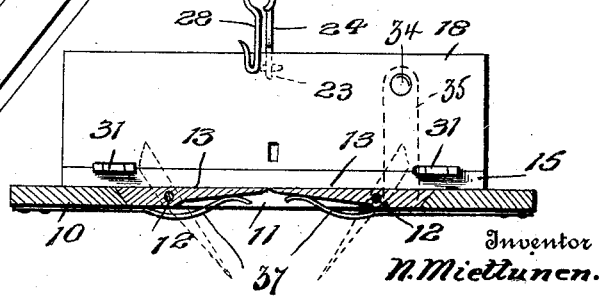

UNITED STATES PATENT OFFICE.

NIKOLAI MIETTUNEN, OF CHISHOLM, MINNESOTA.

TRAP.

1,109,652.  Specification of Letters Patent.  Patented Sept. 1, 1914.

Application filed February 25, 1913. Serial No. 750,676.

*To all whom it may concern:*

Be it known that I, NIKOLAI MIETTUNEN, citizen of the United States, residing at Chisholm, in the county of St. Louis and State of Minnesota, have invented certain new and useful Improvements in Traps, of which the following is a specification.

This invention relates to improvements in animal traps, and has for one of its objects to improve the construction and increase the efficiency and utility of devices of this character.

Another object of the invention is to provide a simply constructed animal trap which may be located over a tub or tank of water or other receiver, and foldable into relatively small space when not in use.

Another object of the invention is to provide a simply constructed device which is foldable into relatively small space when not in use and may be distended and maintained in open position by a supporting member and which is also utilized to hold the bait.

With these and other objects in view the invention consists in certain novel features of construction as hereinafter shown and described and then specifically pointed out in the claim, and in the drawings illustrative of the preferred embodiment of the invention.

Figure 2:
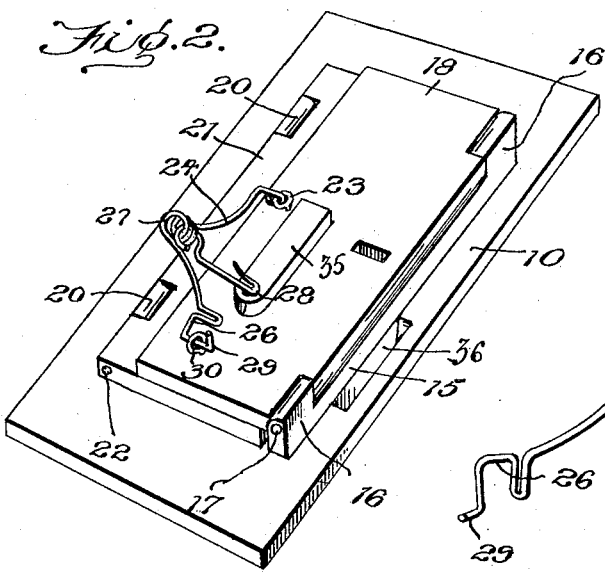
Figure 3:
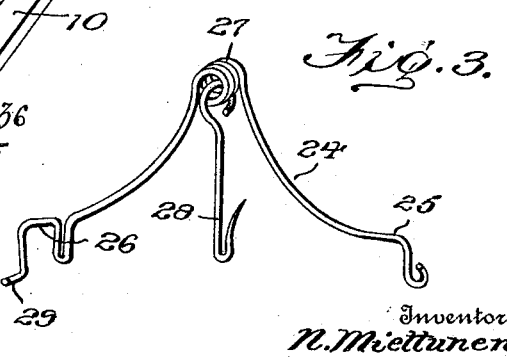

Figure 1 is a perspective view of the improved trap in open or operative position and disposed over a tank of water. Fig. 2 is a perspective view of the improved device in folded or inoperative position. Fig. 3 is a detached view of one of the combined wire supports and bait holders. Fig. 4 is a perspective view showing a modification in the construction. Fig. 5 is a perspective view of the device shown in Fig. 4 and folded. Fig. 6 is a section on the line 6—6 of Fig. 4. Fig. 7 is a detail sectional view illustrating the construction of the lock device for one of the wings.

Corresponding and like parts are referred to in the following description and indicated in all the views of the drawings by the same reference characters.

The improved trap may be constructed of any size to adapt it to animals of different sizes and species, but is designed more particularly for trapping mice, rats and the like, and will be constructed in small size for catching mice and of larger size for catching rats and larger animals.

The improved device comprises a bottom or base member 10 of any required size, but will be sufficiently large to form a closure or cover to a suitable receptacle for water or other liquid in which the trapped animals will be drowned.

When the trap is employed for catching rats and like larger animals the base 10 will be sufficiently large to form a closure for a large pail or a small wash tub or the like, and when employed for catching mice the base will be sufficiently large to cover a smaller receptacle such as a jar or pail. The base may be of any required size and of any required outline, and is provided with an opening 11 preferably rectangular. Pivoted at 12 within the opening are closures 13 which thus constitute trap doors to precipitate the animals through the opening and into the receptacle, represented at 14 and containing the water or other liquid in which the animals are drowned. The pivots 12 are located at some distance from the outer ends of the members 13, and the outer ends of the opening are inclined inwardly and downwardly while the closures are correspondingly inclined so that they will tilt only when the animal passes over the line of the pivots. The shorter portions of the closures externally of the pivots are heavier than the longer portions so that they will be automatically retained in position with their upper faces normally in alinement with the upper face of the base 10 as shown in Fig. 6; and will not tilt downwardly so long as the animal remains upon the shorter heavier portions, but will readily tilt and precipitate the animal through the opening when it passes upon the longer lighter portion of the closures. Two of the closures 13 are preferably employed, as shown in Figs. 1—4—6, so that the animal will be trapped when it approaches from either end of the base, as hereafter explained.

A wing 21 is provided with notches engaging over the cleats 20 and hingedly united thereto by pivots 22 so that the wing will fold down flat upon the base 10, as shown in Fig. 2, and over the tilting members 13. Connected from the base 10 at the opposite side of the opening 11 from the wing 21 is a longitudinal cleat 15 having upwardly directed terminals 16, and a wing 18 bears upon the cleat 15 and is provided with notches at its ends to engage over the upturned terminals 16. The pins 17 are inserted through the upturned terminal 16 and into the body of the wing 18 and thus against the wing hingedly to the cleat. The thickness of the cleat corresponds to the thickness of the wing 21 and thus supports the wing 18 above the base 10 a distance corresponding to the thickness of the wing 21, so that the wing 18 will fold downwardly over the folded wing 21 as shown in Fig. 2.

Pivoted at 34 to the wing 18 is a lock bar 35 adapted to engage in a recess or socket 36 in the base member 10 when the wing 18 is in its elevated or vertical position, and thus lock the wing in position. The member 35 is foldable into engagement with the outer face of the wing 18 when not in use, as shown in Figs. 2 and 5. Light springs 37 are preferably connected to the under face of the base 10 and engaged against the thinner longer ends of the tilting devices 13 to assist in supporting the latter against too easy movement, and to likewise return them positively to their set or operative position after tilting.

When the wings are in their upper position they form a gangway or runway for the animals and thus insure the passage of the animals to the tilting closures. As a means for holding the wings of the trap in assembled vertical position the present invention employs a wire-bail 24, one terminal of which is secured to the wing 18 and the other terminal of which is adapted for detachable engagement with the wing 21, as will be hereinafter fully described. In pivotally attaching one terminal of the bail 24 to the wing 18 there is preferably formed on the bail member 24 an eyelet which is engageable with a staple or similar device carried by the wing 18, as indicated at 23' in Fig. 5. The major portion of the bail-member 24 is designed to extend above the upper edges of the wings 18 and 21 in the manner of a bucket bail so that at a point approximately midway of its length it may be formed with a plurality of convolutions or coils indicated at 27. These coils 27 are adapted to receive an eyelet formed on a bait-hook 28, which latter member is employed in holding the cheese or other bait above the tilting devices or trap doors 13. As shown at 25 the bail-member 24 is bent adjacent one terminal to engage over the upper edge of the wing to which it is pivoted, asd is likewise provided with a loop or catch 26 near its other end to engage over the other wing, as illustrated in Fig. 1. At its free end the rod 24 is bent laterally, as represented at 29, to form a hook or catch, and connected to the wing to which the rod 24 is pivoted is an eye 30 in position to receive the hook or catch 29 when the trap is disposed in folded position, as shown in Fig. 2, and thus hold the rod from movement when not in use.

From the foregoing it will be observed that the bail member 24 not only provides a support whereby the bait hook may be suspended above the trap doors of the device but that it also serves to hold the wings 18 and 21 in the desired vertical position when the elements of the trap are in operative assembled relation. By this simple means an effectual trap is produced which may be disposed over a suitable receptacle for water and easily "set" and baited.

The tilting members 13, it will be noted, are simple in action and are automatically reset after each operation, and do not require any readjustment after an animal has been trapped.

In Figs. 4—5—6 a slight modification in the construction is shown which may be employed under certain conditions if required. In the modified structure the cleat or rib 15 is formed without the engaging loop 26, but a holding eye 33 is connected to the base 10 near the hinged edge of the wing 21 in position to receive the lateral terminal 29, as shown in Fig. 5, and thus lock the rod 24 to the base and likewise arrange the rod to assist in holding the folded wings upon the base. By this means the rod 24 performs the two-fold function of a means for maintaining the wings in operative position and also as a bait support in the arrangement shown in Figs. 1—2—3, and performs an additional function of a means for holding the wings in closed position when the modification shown in Figs. 4, 5 and 6 is employed.

Having thus described the invention, what is claimed is:

In a trap, a base having an opening, a spring-pressed closure for the opening, wings hinged to the base at opposite sides of the opening, a lock-bar pivoted to one of the wings and having its free terminal arranged for insertion in a recess formed in the base, a bait hook, and a bail adapted to suspend the bait hook above the closure, said bail having one terminal pivotally secured to one of the wings and its other terminal adapted to be detachably secured to the other wing whereby the bail co-acts with the lock bar in holding the wings in operative assembled position.

In testimony whereof I affix my signature in presence of two witnesses.

NICK MIETTUNEN. [L. S.]

Witnesses:
MATT ROBERTS,
THOS. A. HAWSON.